(12) United States Patent
Stabenow et al.

(10) Patent No.: US 8,531,076 B2
(45) Date of Patent: Sep. 10, 2013

(54) STATOR FOR AN ELECTRIC MOTOR

(75) Inventors: Sara A. Stabenow, Whitmore Lake, MI (US); Stephen R. Smith, Holly, MI (US); Edward Panozzo, Mokena, IL (US); David F. Titmuss, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 13/109,058

(22) Filed: May 17, 2011

(65) Prior Publication Data

US 2012/0293034 A1      Nov. 22, 2012

(51) Int. Cl.
*H02K 3/04*      (2006.01)
*H02K 1/04*      (2006.01)
*H02K 3/00*      (2006.01)
*H02K 3/34*      (2006.01)

(52) U.S. Cl.
USPC ............. 310/201; 310/43; 310/192; 310/202; 310/215

(58) Field of Classification Search
USPC ............................ 310/201, 202, 43, 192, 215
See application file for complete search history.

(56) References Cited

U.S. PATENT DOCUMENTS 3,974,314 A * 8/1976 Fuchs ........................... 428/212
5,721,397 A * 2/1998 Weinberg ................ 174/110 SR

FOREIGN PATENT DOCUMENTS

JP      2006166592 A  *  6/2006

OTHER PUBLICATIONS

Machine Trnaslation JP2006166592 (2006).*

* cited by examiner

*Primary Examiner* — Tran Nguyen
*Assistant Examiner* — Jose Gonzalez Quinones
(74) *Attorney, Agent, or Firm* — Quinn Law Group, PLLC

(57) ABSTRACT

A stator for an electric motor includes first and second rows of conductors arranged concentrically around an axis inside a steel core. Each conductor includes a linking end. The stator also includes a first dielectric shim ring arranged between the two rows of conductors. Each conductor of the first row is bent in either a clockwise or a counter-clockwise direction relative to the axis and each conductor of the second row is bent in the opposite direction. The linking end of each conductor of the first row is attached to the linking end of an adjacent conductor of the second row after the conductors are bent. The first shim ring separates the first and second rows of conductors when the conductors are being bent, and is also at least partially disposed between the first and second rows of conductors when the linking ends are being attached.

17 Claims, 4 Drawing Sheets

STATOR FOR AN ELECTRIC MOTOR

TECHNICAL FIELD

The invention relates to a stator of an electric motor.

BACKGROUND

An electric motor is a type of a machine that converts electric energy into mechanical energy. Electric motors may be configured as an alternating current (AC) or a direct current (DC) type. Electric motors operate through interacting magnetic fields and current-carrying conductors to generate force. Recent technological advances have facilitated development of compact, high-power electric motors for high-volume applications, such as for powering a vehicle, i.e., a hybrid or electric vehicle.

A stator is the stationary part of a rotor system found in electric motors. The stator may either include permanent magnets or electromagnet windings formed from magnet bars or wires. Depending on the configuration of the electric motor, the stator may act as a field magnet for interacting with an armature to generate motion, or it may act as the armature, receiving its influence from moving field coils on the rotor. Stators often use various shims to mechanically separate the magnet bars or wires for durability, and, typically, also use dielectric insulators to isolate magnet bars or wires of dissimilar phases.

SUMMARY

A stator for an alternating current (AC) electric motor includes a steel core disposed concentrically around an axis. The stator also includes a first row of conductors arranged in the steel core concentrically around the axis and a second row of conductors arranged adjacent to the first row of conductors such that the first row of conductors is arranged concentrically around the second row. The stator additionally includes a first dielectric shim ring arranged concentrically around the axis between the first row of conductors and the second row of conductors. Each conductor of the first and second rows includes a linking end. Each conductor of the first row is configured to be bent or twisted in one of a clockwise and a counter-clockwise direction with respect to the axis and each conductor of the second row is configured to be bent in the other of the clockwise and the counter-clockwise direction with respect to the axis. The linking end of each conductor of the first row is attached to the linking end of an adjacent conductor of the second row after each conductor of the first row and of the second row is bent, such that an AC phase is defined. The first shim ring separates the first row of conductors from the second row of conductors when each of the first and second rows of conductors is being bent. The first shim ring is also at least partially disposed between the first and second rows of conductors when the linking ends of the adjacent conductors are being attached and afterward.

The steel core may include a row of slots arranged concentrically around the axis. The steel core may also include a first row of slot liners and a second row of slot liners inserted into the row of slots, such that one slot liner of the first row of slot liners and one slot liner of the second row of slot liners is inserted into each slot. The first row of slot liners may then be arranged concentrically around and adjacent to the second row of slot liners. In such a case, the first row of conductors may be inserted through the first row of slot liners and the second row of conductors may be inserted through the second row of slot liners.

The first dielectric shim ring may be formed from an advanced polymer film. In such a case, the advanced polymer film may be a polyether ether ketone (PEEK) material.

The first dielectric shim ring may be folded into at least two layers in the proximity of the linking ends of the adjacent conductors.

The stator may also include a third row of conductors arranged in the steel core concentrically around the axis and a fourth row of conductors arranged adjacent to the third row of conductors such that the third row of conductors is arranged concentrically around the fourth row. The stator may additionally include a second dielectric shim ring arranged concentrically around the axis between the third row of conductors and the fourth row of conductors. Furthermore, the stator may include a third dielectric shim ring arranged concentrically around the axis between the second row of conductors and the third row of conductors. Each conductor of the third row and each conductor of the fourth row may include a linking end. Each conductor of the third row may be configured to be bent in one of a clockwise and a counter-clockwise direction with respect to the axis and each conductor of the fourth row may be configured to be bent in the other of the clockwise and the counter-clockwise direction with respect to the axis. Accordingly, the linking end of each conductor of the third row may be attached to the linking end of an adjacent conductor of the fourth row after each of the conductors of the first row and each of the conductors of the second row is bent. The third shim ring may fully separate the second row of conductors from the third row of conductors.

An AC electric motor employing the above described stator and a method of assembling a stator for an electric motor are also provided.

The above features and advantages and other features and advantages of the present invention are readily apparent from the following detailed description of the best modes for carrying out the invention when taken in connection with the accompanying drawings.

DETAILED DESCRIPTION

Figure 1:
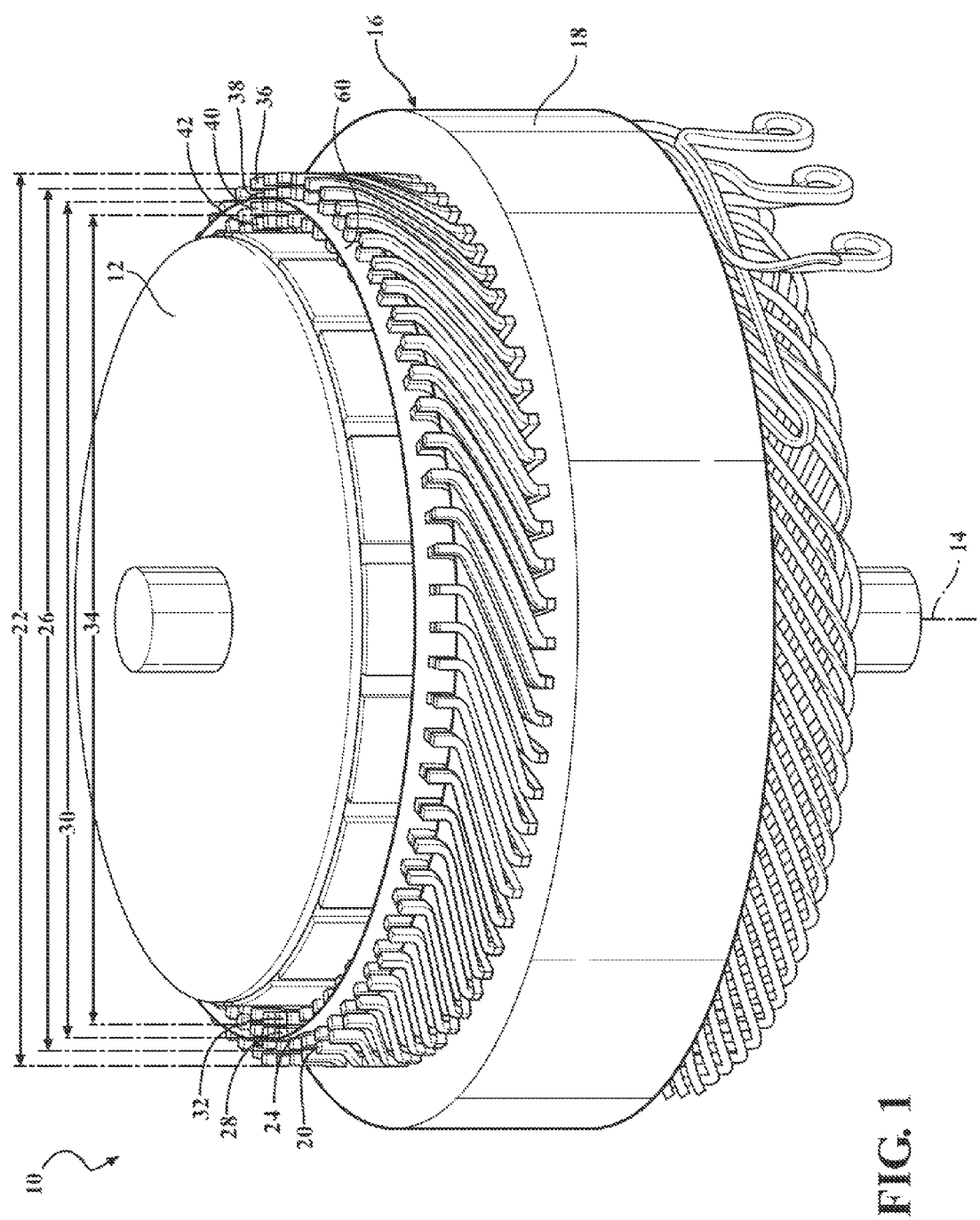
FIG. 1 is a perspective schematic illustration of an alternating current (AC) electric motor having a rotor and a stator.

Referring to the drawings, wherein like reference numbers refer to like components, FIG. 1 shows an alternating current (AC) electric motor 10. The electric motor 10 may be employed as part of a powertrain or a propulsion system for a motor vehicle such as a hybrid or an electric vehicle. The electric motor includes a rotor 12 that is disposed concentrically around an axis 14 and internally with respect to a stator 16. Similar to the rotor 12, the stator 16 is disposed concentrically around the axis 14. The rotor 12 is configured to rotate about the axis 14 and relative to the stator 16.

Figure 2:
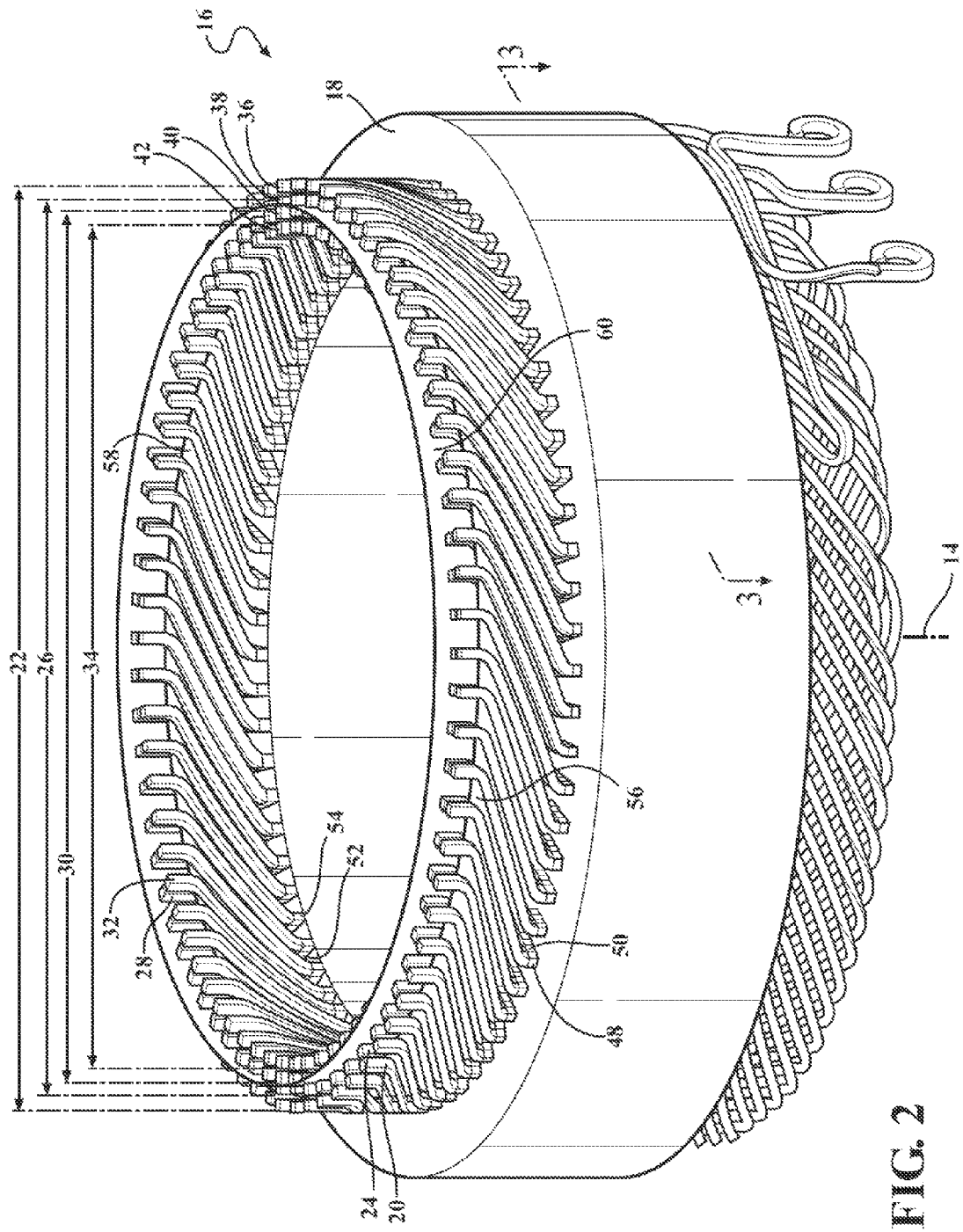
FIG. 2 is a perspective view of the stator portion of the electric motor shown in FIG. 1.

As shown in FIGS. 1 and 2, the stator 16 includes a steel core 18 disposed concentrically around the axis 14. The steel core 18 is a lamination stack of thin steel plates, for example a silicone-carbon type. The stator 16 also includes a first row of conductors 20 that is arranged in the steel core 18 concentrically around the axis 14 on a diameter 22, and a second row of conductors 24 arranged adjacent to the first row of conductors 20 on a diameter 26, such that the first row of conductors is arranged concentrically around the second row. The stator 16 additionally includes a third row of conductors 28 that is arranged in the steel core 18 concentrically around the axis 14 on a diameter 30. Furthermore, the stator 16 includes a fourth row of conductors 32 arranged adjacent to the third row of conductors 28 on a diameter 34, such that the third row of conductors is arranged concentrically around the fourth row, while the second row of conductors 24 is arranged concentrically around the third row of conductors 28. As shown, the conductors used in the first, second, third and fourth rows of conductors 20, 24, 28, 32 are wires or square cross-section segments of bar stock that are coated with protective enamel. Each conductor of the first row of conductors 20 has a first linking end 36; each conductor of the second row of conductors 24 has a second linking end 38; each conductor of the third row of conductors 28 has a third linking end 40; and each conductor of the fourth row of conductors 32 has a fourth linking end 42.

Figure 3:
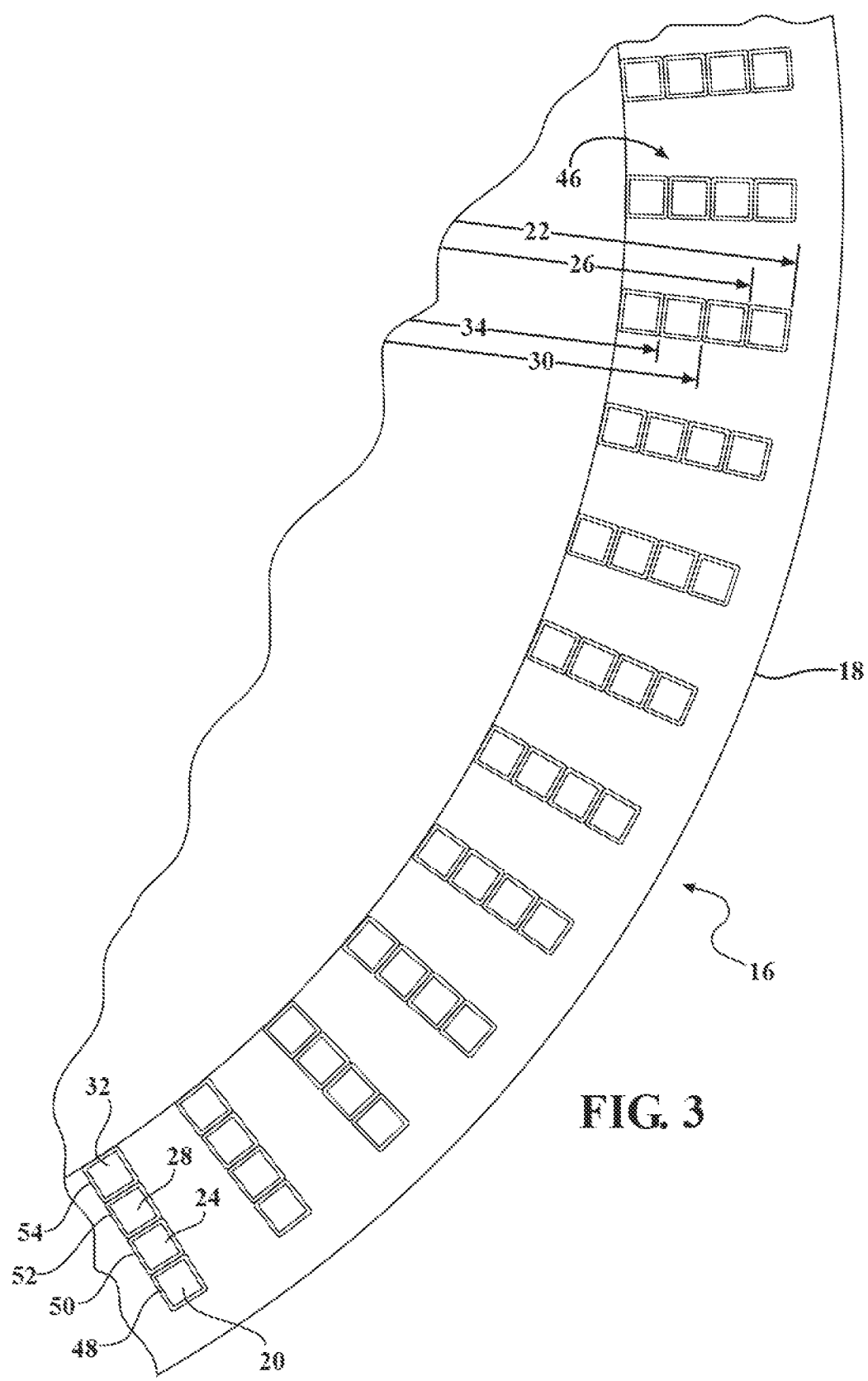
FIG. 3 is a close-up view of a portion of a cross-section of the stator that is shown in FIG. 1, illustrating four rows of conductors inserted into a stator slot.

FIG. 3 depicts a portion of a cross-section of the stator 16 taken along a line 3-3 that is shown in FIG. 2. As may be seen in FIG. 2, the steel core 18 includes a row of slots 46 arranged concentrically around the axis 14. A first row of slot liners 48, a second row of slot liners 50, a third row of slot liners 52, and a fourth row of slot liners 54 are each inserted into the row of slots 46. As is shown in FIG. 2, one slot liner of the first row of slot liners 48, one slot liner of the second row of slot liners 50, one slot liner of the third row of slot liners 52, and one slot liner of the first row of slot liners 54 are each inserted into each slot in the row of slots 46. Accordingly, the first, second, third, and fourth row of slot liners 48, 50, 52, and 52 are each arranged concentrically and adjacent with respect to one another. The first, second, third, and fourth rows of conductors 20, 24, 28, and 32 are inserted through the first, second, third, and fourth rows of slot liners 48, 50, 52, and 54, respectively.

A first dielectric shim ring 56 is arranged concentrically around the axis 14 and is disposed between the first row of conductors 20 and the second row of conductors 24. Similarly, a second dielectric shim ring 58 is arranged concentrically around the axis 14 and is disposed between the third row of conductors 28 and the fourth row of conductors 32. The first and the second dielectric shim rings 56, 58 may be formed from an advanced polymer film, such as a polyether ether ketone (PEEK) material. The PEEK material is a semi-crystalline organic polymer thermoplastic that is often used in engineering applications for its ability to retain mechanical durability and chemical resistance properties at high temperatures. The Young's modulus of PEEK material is approximately 3.6 GPa and its tensile strength is in the range of 90-100 Mpa. PEEK has a glass transition temperature of around 143° C. (289° F.) and a melting temperature of around 343° C. (649° F.). The PEEK material is an appropriate candidate for the first and second dielectric shim rings 56, 58 because it is highly resistant to thermal degradation, as well as attack by both organic and aqueous environments, such as an automatic transmission fluid (ATF) that the stator 16 may be exposed to for cooling when the electric motor 10 is used in a vehicle powertrain. The PEEK material is also an effective electrical insulator, and may thus be used to isolate the first row of conductors 20 from the second row of conductors 24 and the third row of conductors 28 from the fourth row of conductors 32 to prevent an electrical short between the respective conductors.

Referring back to FIGS. 1 and 2, each individual conductor of the first row of conductors 20 is configured to be bent or twisted, as represented by an angle θ, in one of a clockwise and a counter-clockwise direction with respect to the axis 14. Additionally, each individual conductor of the second row of conductors 24 is configured to be bent in the other of the clockwise and the counter-clockwise direction or opposite of the bend direction of the first row of conductors 20. Similarly, each individual conductor of the third row of conductors 28 is configured to be bent or twisted in one of a clockwise and a counter-clockwise direction with respect to the axis 14. Correspondingly, each individual conductor of the fourth row of conductors 32 is configured to be bent in the other of the clockwise and the counter-clockwise direction or opposite of the bend direction of the third row of conductors 28.

The first linking end 36 of each conductor of the first row of conductors 20 is attached or welded to the second linking end 38 of an adjacent conductor of the second row of conductors 24 after each conductor of the first row and of the second row is bent. Similarly, the third linking end 40 of each conductor of the third row of conductors 28 is attached or welded to the fourth linking end 42 of an adjacent conductor of the fourth row of conductors 32 after each conductor of the third row and of the fourth row is bent. As is understood by those skilled in the art, such attachment of the linking ends 36 and 38, as well as the attachment of the linking ends 40 and 42, creates a continuous connection between the respective conductors in order to generate or define a particular AC phase of the electric motor 10.

Because the first and second shim rings 56, 58 are characterized by significant mechanical durability, the first and second shim rings may withstand being maintained between the first and second rows of conductors 20, 24 and between the third and fourth rows of conductors 28, 32 without failure while the first, second, third, and fourth rows of conductors are being bent. Thus being positioned in between the corresponding rows of conductors, the first and second shim rings 56, 58 facilitate the first and second rows of conductors 20, 24 and the third and fourth rows of conductors 28, 32 to be bent without any damage to the conductors' enamel coating. Additionally, because the first and second shim rings 56, 58 are highly resistant to thermal degradation, the respective first and second shim rings may withstand being maintained in the vicinity of the first and second linking ends 36, 38 and the third and fourth linking ends 40, 42 while the appropriate adjacent linking ends are being attached. Furthermore, during operation of the electric motor 10, the first and second shim rings 56, 58 may function to electrically isolate the first row of conductors 20 from the second row of conductors 24 and prevent an electrical short between the respective conductors.

Each of the first and second dielectric shim rings 56, 58 may also be folded into at least two layers in the proximity of the linking ends 36, 38, 40, and 42 of the adjacent conductors. Such folded shim rings may increase the gap between the respective adjacent conductors and further improve the electrical insulation effect of the particular shim ring.

FIGS. 1 and 2 also show a third dielectric shim ring 60 arranged concentrically around the axis 14 between the second row of conductors 24 and the third row of conductors 28. The third shim ring 60 fully separates the second row of conductors 24 from the third row of conductors 28 for effective isolation of the subject rows of conductors. Similar to the first and second shim rings 56, 58, the third shim ring 60 may be formed from an advanced polymer film, such as the polyether ether ketone (PEEK) material described above. The third shim ring 60 is however taller than the first and second shim rings 56, 58, because while the first and second shim rings need only separate the respective rows of wires up to the linking ends, the third shim ring fully separates the second and third rows of conductors 24, 28.

Accordingly, the first shim ring 56 separates the first row of conductors 20 from the second row of conductors 24, and the second shim ring 58 separates the third row of conductors 28 from the fourth row of conductors 32 when each of the first, second, third and fourth rows of conductors is being bent. Additionally, the first shim ring 56 remains at least partially disposed between the respective first and second rows of conductors 20, 24, and the second shim ring 58 remains at least partially disposed between the third and fourth rows of conductors 28, 32 when the linking ends of the adjacent conductors are being attached. The first and second shim rings 56, 58 remain in position between the respective rows of conductors after the stator 16 is fully assembled into the electric motor 10 and perform their electric insulation function during operation of the electric motor. The third shim ring 60 similarly remains in position between the second and third rows of conductors 24, 28 after assembly of the electric motor 10 is complete to fully separate the subject rows of conductors to perform its electric insulation function during operation of the electric motor.

Figure 4:
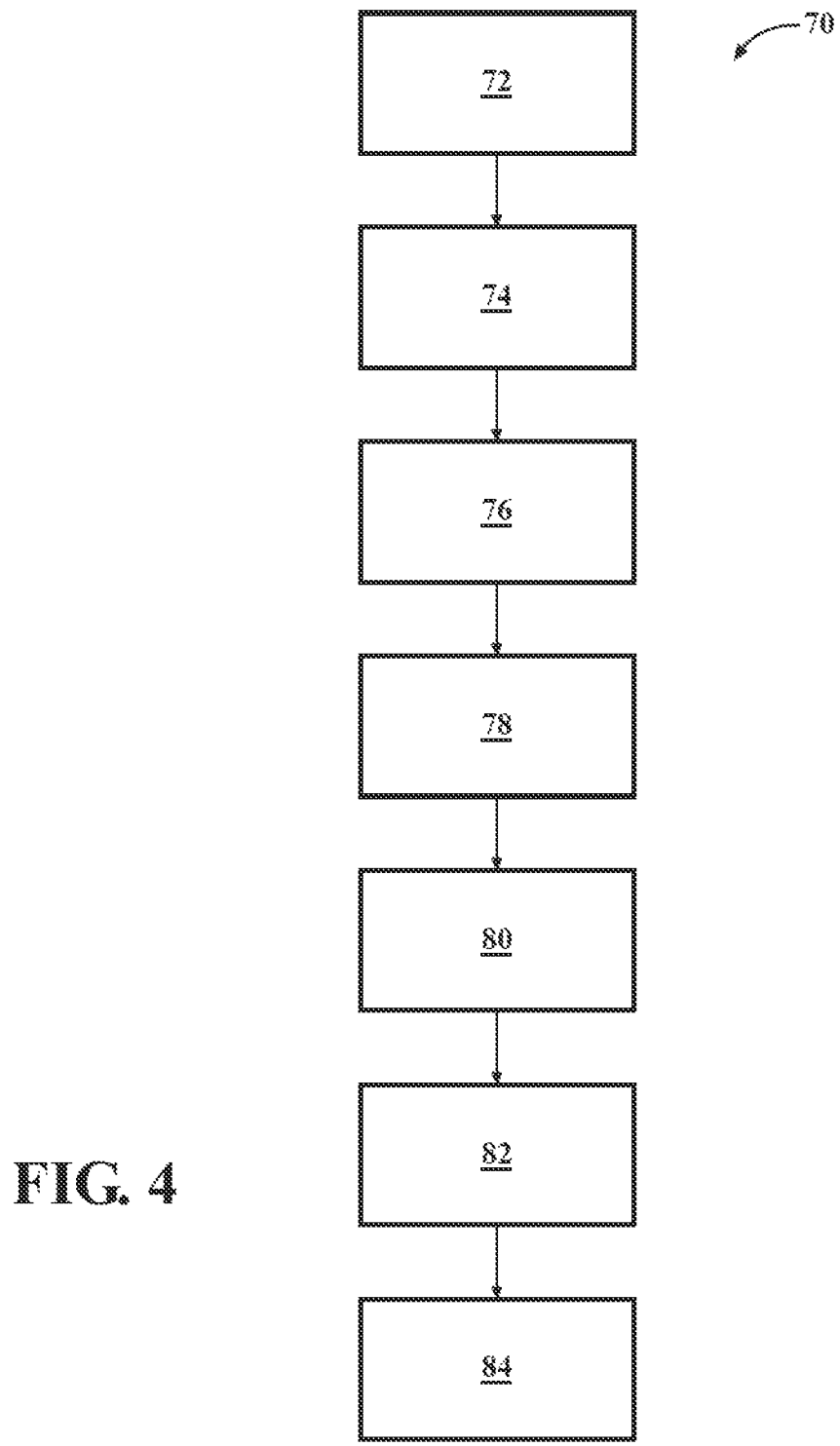
FIG. 4 is a flow chart illustrating a method of assembling the stator depicted in FIGS. 1-3.

FIG. 4 depicts a method 70 of assembling the stator 16, which is described above with respect to FIGS. 1-3. The method commences in frame 72 where it includes providing the steel core 18, and then proceeds to frame 74 where it includes inserting the first row of conductors 20 and the second row of conductors 24 through the row of slots 46. Following frame 74, the method advances to frame 76. In frame 76, the method includes inserting the first dielectric shim ring 56 between the first and second rows of conductors 20, 24 such that the first shim ring separates the first row of conductors from the second row of conductors.

Following frame 76, the method proceeds to frame 78, where it includes bending each conductor of the first row of conductors 20 in one of a clockwise and a counter-clockwise direction with respect to the axis 14. In frame 78, the method additionally includes bending each conductor of the second row of conductors 24 in an opposite direction from that of the first row of conductors 20. After frame 78, the method progresses to frame 80, where the method includes attaching the first linking ends 36 of the first row of conductors 20 to the adjacent linking ends 38 of the second row of conductors 24 after each conductor of the first row and of the second row is bent.

From frame 80, the method advances to frame 82, where it includes maintaining the first shim ring 56 between the first row of conductors 20 and the second row of conductors 24 to separate the first row of conductors from the second row of conductors when each of the first and second rows of conductors is being bent. After frame 82, the method moves to frame 84, where it includes maintaining the first shim ring 56 at least partially disposed between the first and second rows of conductors 20, 24 when the linking ends 36 and 38 of the adjacent conductors are being attached.

Additionally, before inserting the first row of conductors 20 and the second row of conductors 24 through the row of slots 46, the method may include inserting the first and second row of slot liners 48, 50 into the row of slots 46. Accordingly, such an operation would ensure that one slot liner of the first row of slot liners 48 and one slot liner of the second row of slot liners 50 is inserted into each slot, and the first row of slot liners is arranged concentrically around and adjacent to the second row of slot liners. The method may also include folding the first shim ring 56 into at least two layers in the proximity of the linking ends 36 and 38 of the adjacent conductors.

As described with respect to FIGS. 1-3, the method may also include inserting the slot liners 52 and 54 and the third and fourth rows of conductors 28 and 32 into the row of slots 46. Such an operation would arrange the third row of conductors 28 adjacent to and concentrically around the fourth row 32 of conductors. Also, the method may include inserting the second dielectric shim ring 58 between the third and the fourth rows of conductors 28 and 32, such that the second shim ring separates the third row of conductors from the fourth row of conductors. Additionally, the method may include bending each of the third row of conductors 28 in one of a clockwise and a counter-clockwise direction with respect to the axis 14 and bending each of the fourth row of conductors 32 in the opposite direction relative to the third row of conductors 28.

After each of the third and fourth rows of conductors 28, 32 is bent, the method may include attaching the linking ends 40 and 42 of the adjacent conductors of the third and fourth rows. Moreover, after the linking ends 40 and 42 have been attached, the method may include inserting the third dielectric shim ring 60 between the second row of conductors 24 and the third row of conductors 28, such that the second shim ring fully separates the second and the third rows of conductors 24, 28. The method may furthermore include maintaining the third shim ring 60 between the second row of conductors and the third row of conductors to fully separate the second row and the third row of conductors 24, 28.

While the best modes for carrying out the invention have been described in detail, those familiar with the art to which this invention relates will recognize various alternative designs and embodiments for practicing the invention within the scope of the appended claims.

The invention claimed is:

1. A stator for an alternating current (AC) electric motor, the stator comprising:
   a steel core disposed concentrically around an axis;
   a first row of conductors arranged in the steel core concentrically around the axis;
   a second row of conductors arranged adjacent to the first row of conductors such that the first row of conductors is arranged concentrically around the second row;
   a third row of conductors arranged in the steel core concentrically around the axis;
   a fourth row of conductors arranged adjacent to the third row of conductors such that the third row of conductors is arranged concentrically around the fourth row of conductors;
   a first dielectric shim ring arranged concentrically around the axis between the first row of conductors and the second row of conductors;
   a second dielectric shim ring arranged concentrically around the axis between the third row of conductors and the fourth row of conductors; and
   a third dielectric shim ring arranged concentrically around the axis between the second row of conductors and the third row of conductors;
   wherein:
      each conductor of the first row, each conductor of the second row, each conductor of the third row, and each conductor of the fourth row includes a linking end;
      each conductor of the first row is configured to be bent in one of a clockwise and a counter-clockwise direction with respect to the axis and each conductor of the second row is configured to be bent in the other of the clockwise and the counter-clockwise direction with respect to the axis;

each conductor of the third row is configured to be bent in one of a clockwise and a counter-clockwise direction with respect to the axis and each conductor of the fourth row is configured to be bent in the other of the clockwise and the counter-clockwise direction with respect to the axis;

the linking end of each conductor of the first row is attached to the linking end of an adjacent conductor of the second row after each conductor of the first row and of the second row is bent, such that an AC phase is defined;

the linking end of each conductor of the third row is attached to the linking end of an adjacent conductor of the fourth row after each of the conductors of the first row and each of the conductors of the second row is bent, such that another AC phase is defined;

the first shim ring separates the first row of conductors from the second row of conductors when each of the first and second rows of conductors is being bent, the first shim ring being at least partially disposed between the first and second rows of conductors when the linking ends of the adjacent conductors are being attached; and the third shim ring fully separates and electrically insulates the second row of conductors from the third row of conductors.

2. The stator according to claim 1, wherein the steel core includes a row of slots arranged concentrically around the axis, and further includes a first row of slot liners and a second row of slot liners inserted into the row of slots, such that one slot liner of the first row of slot liners and one slot liner of the second row of slot liners is inserted into each slot, and the first row of slot liners is arranged concentrically around and adjacent to the second row of slot liners.

3. The stator according to claim 2, wherein the first row of conductors is inserted through the first row of slot liners and the second row of conductors is inserted through the second row of slot liners.

4. The stator according to claim 1, wherein the first dielectric shim ring is formed from an advanced polymer film.

5. The stator according to claim 4, wherein the advanced polymer film is a polyether ether ketone (PEEK) material.

6. The stator according to claim 1, wherein the first dielectric shim ring is folded into at least two layers in the proximity of the linking ends of the adjacent conductors.

7. An alternating current (AC) electric motor comprising:
a rotor;
a stator disposed concentrically around an axis, the stator including:
a steel core disposed concentrically around an axis;
a first row of conductors arranged in the steel core concentrically around the axis;
a second row of conductors arranged adjacent to the first row of conductors such that the first row of conductors is arranged concentrically around the second row;
a third row of conductors arranged in the steel core concentrically around the axis;
a fourth row of conductors arranged adjacent to the third row of conductors such that the third row of conductors is arranged concentrically around the fourth row of conductors;
a first dielectric shim ring arranged concentrically around the axis between the first row of conductors and the second row of conductors;
a second dielectric shim ring arranged concentrically around the axis between the third row of conductors and the fourth row of conductors; and
a third dielectric shim ring arranged concentrically around the axis between the second row of conductors and the third row of conductors;

wherein:
the rotor is disposed concentrically around the axis and internally with respect to the stator, and is configured to rotate about the axis;

each conductor of the first row, each conductor of the second row, each conductor of the third row, and each conductor of the fourth row includes a linking end;

each conductor of the first row is configured to be bent in one of a clockwise and a counter-clockwise direction with respect to the axis and each conductor of the second row is configured to be bent in the other of the clockwise and the counter-clockwise direction with respect to the axis;

each conductor of the third row is configured to be bent in one of a clockwise and a counter-clockwise direction with respect to the axis and each conductor of the fourth row is configured to be bent in the other of the clockwise and the counter-clockwise direction with respect to the axis;

the linking end of each conductor of the first row is attached to the linking end of an adjacent conductor of the second row after each conductor of the first row and of the second row is bent, such that an AC phase is defined;

the linking end of each conductor of the third row is attached to the linking end of an adjacent conductor of the fourth row after each of the conductors of the first row and each of the conductors of the second row is bent, such that another AC phase is defined;

the first shim ring separates the first row of conductors from the second row of conductors when each of the first and second rows of conductors is being bent, the first shim ring being at least partially disposed between the first and second rows of conductors when the linking ends of the adjacent conductors are being attached; and the third shim ring fully separates and electrically insulates the second row of conductors from the third row of conductors.

8. The electric motor according to claim 7, wherein the steel core includes a row of slots arranged concentrically around the axis, and further includes a first row of slot liners and a second row of slot liners inserted into the row of slots, such that one slot liner of the first row of slot liners and one slot liner of the second row of slot liners is inserted into each slot, and the first row of slot liners is arranged concentrically around and adjacent to the second row of slot liners.

9. The electric motor according to claim 8, wherein the first row of conductors is inserted through the first row of slot liners and the second row of conductors is inserted through the second row of slot liners.

10. The electric motor according to claim 7, wherein the first dielectric shim ring is formed from an advanced polymer film.

11. The electric motor according to claim 10, wherein the advanced polymer film is a polyether ether ketone (PEEK) material.

12. The electric motor according to claim 7, wherein the first dielectric shim ring is folded into at least two layers in the proximity of the linking ends of the adjacent conductors.

13. A method of assembling a stator for an alternating current (AC) electric motor, the method comprising:

providing a steel core disposed concentrically around an axis and having a row of slots arranged concentrically around the axis;

inserting a first row of conductors through the row of slots and a second row of conductors through the row of slots, wherein each conductor of the first row and each conductor of the second row includes a linking end;

inserting a third row of conductors and a fourth row of conductors into the row of slots, such that the third row of conductors is arranged adjacent to and concentrically around the fourth row of conductors, wherein each conductor of the third row and each conductor of the fourth row includes a linking end;

inserting a first dielectric shim ring between the first row of conductors and the second row of conductors such that the first shim ring is arranged concentrically around the axis and separates the first row of conductors from the second row of conductors;

inserting a second dielectric shim ring between the third row of conductors and the fourth row of conductors such that the second shim ring is arranged concentrically around the axis and separates the third row of conductors from the fourth row of conductors;

bending each conductor of the first row in one of a clockwise and a counter-clockwise direction with respect to the axis and bending each conductor of the second row in the other of the clockwise and the counter-clockwise direction with respect to the axis;

bending each conductor of the third row in one of a clockwise and a counter-clockwise direction with respect to the axis and bending each conductor of the fourth row in the other of the clockwise and the counter-clockwise direction with respect to the axis;

attaching the linking end of each conductor of the first row to the linking end of an adjacent conductor of the second row after each conductor of the first row and of the second row is bent, such that an AC phase is defined;

attaching the linking end of each conductor of the third row to the linking end of an adjacent conductor of the fourth row after each conductor of the third row and of the fourth row is bent, such that another AC phase is defined;

inserting a third dielectric shim ring between the second row of conductors and the third row of conductors such that the second shim ring is arranged concentrically around the axis;

maintaining the first shim ring between the first row of conductors and the second row of conductors to separate the first row of conductors from the second row of conductors when each of the first and second rows of conductors is being bent;

maintaining the first shim ring at least partially disposed between the first and second rows of conductors when the linking ends of the adjacent conductors are being attached; and maintaining the third shim ring between the second row of conductors and the third row of conductors to fully separate and electrically insulate the conductors of the second row from the conductors of the third row.

14. The method according to claim 13, further comprising inserting a first row of slot liners and a second row of slot liners into the row of slots, such that one slot liner of the first row of slot liners and one slot liner of the second row of slot liners is inserted into each slot, and the first row of slot liners is arranged concentrically around and adjacent to the second row of slot liners, wherein said inserting the first row of conductors and the second row of conductors through the row of slots includes inserting the first row of conductors through the first row of slot liners and the second row of conductors through the second row of slot liners.

15. The method according to claim 13, wherein the first dielectric shim ring is formed from an advanced polymer film.

16. The method according to claim 14, wherein the advanced polymer film is a polyether ether ketone (PEEK) material.

17. The method according to claim 13, further comprising folding the first dielectric shim ring into at least two layers in the proximity of the linking ends of the adjacent conductors.

\* \* \* \* \*